(12) United States Patent
Offensend et al.

(10) Patent No.: US 10,399,283 B2
(45) Date of Patent: Sep. 3, 2019

(54) METHOD AND DEVICE FOR PRODUCING CONTOURED COMPOSITE LAMINATE STIFFENERS WITH REDUCED WRINKLING

(71) Applicant: The Boeing Company, Chicago, IL (US)

(72) Inventors: Christopher David Offensend, Seattle, WA (US); Kirk Ben Kajita, Newcastle, WA (US); Kieran P. Davis, Seattle, WA (US); Matthew R. Soja, Seattle, WA (US)

(73) Assignee: The Boeing Company, Chicago, IL (US)

( * ) Notice: Subject to any disclaimer, the term of this patent is extended or adjusted under 35 U.S.C. 154(b) by 733 days.

(21) Appl. No.: 14/876,475

(22) Filed: Oct. 6, 2015

(65) Prior Publication Data

US 2017/0095983 A1  Apr. 6, 2017

(51) Int. Cl.

| | |
|---|---|
| *B64C 1/06* | (2006.01) |
| *B64C 3/18* | (2006.01) |
| *B29C 53/02* | (2006.01) |
| *B29C 53/80* | (2006.01) |
| *B29C 70/56* | (2006.01) |
| *B29C 70/34* | (2006.01) |
| *B29C 70/44* | (2006.01) |
| *B29D 99/00* | (2010.01) |

(Continued)

(52) U.S. Cl.
CPC .............. *B29C 70/34* (2013.01); *B29C 53/02* (2013.01); *B29C 53/80* (2013.01); *B29C 70/222* (2013.01); *B29C 70/44* (2013.01); *B29C 70/56* (2013.01); *B29D 99/0003* (2013.01); *B64C 1/06* (2013.01); *B64C 3/18* (2013.01); *B64F 5/10* (2017.01); *B29L 2031/001* (2013.01); *B29L 2031/3082* (2013.01); *B29L 2031/7502* (2013.01); *B64C 2001/0072* (2013.01); *Y02T 50/43* (2013.01)

(58) Field of Classification Search
None
See application file for complete search history.

(56) References Cited

U.S. PATENT DOCUMENTS

| | | |
|---|---|---|
| 4,790,898 A | 12/1988 | Woods |
| 4,861,406 A | 8/1989 | Baker et al. |

(Continued)

FOREIGN PATENT DOCUMENTS

| | | |
|---|---|---|
| DE | 3905520 A1 | 8/1990 |
| FR | 2928295 A1 | 9/2009 |

(Continued)

OTHER PUBLICATIONS

Extended European Search Report, dated Apr. 4, 2017, regarding Application No. 16180509.8, 10 pages.

(Continued)

*Primary Examiner* — Barbara J Musser
(74) *Attorney, Agent, or Firm* — Yee & Associates, P.C.

(57) ABSTRACT

A contoured composite laminate stiffener is fabricated by assembling a substantially flat composite laminate charge and forming the charge into a substantially straight stiffener having a desired cross sectional shape. A contour is formed in the stiffener which has an inside radius and an outside radius. Ply wrinkling is substantially eliminated by reducing compression strain on the inside radius as the stiffener as being contoured.

14 Claims, 10 Drawing Sheets

(51) Int. Cl.
    *B29C 70/22*     (2006.01)
    *B64F 5/10*     (2017.01)
    *B29L 31/00*     (2006.01)
    *B29L 31/30*     (2006.01)
    *B64C 1/00*     (2006.01)

(56) References Cited

U.S. PATENT DOCUMENTS

| | | |
|---|---|---|
| 5,700,347 A | 12/1997 | McCowin |
| 6,045,651 A | 4/2000 | Kline et al. |
| 7,137,182 B2 | 11/2006 | Nelson |
| 7,644,491 B2 | 1/2010 | Absalonson |
| 7,788,784 B2 | 9/2010 | Absalonson et al. |
| 7,814,644 B2 | 10/2010 | Harrison |
| 8,997,642 B2 | 4/2015 | Stewart et al. |
| 2006/0108057 A1 | 5/2006 | Pham et al. |
| 2013/0036922 A1 | 2/2013 | Stewart et al. |
| 2013/0327472 A1 | 12/2013 | De Mattia |
| 2013/0333830 A1 | 12/2013 | Stewart |
| 2015/0197065 A1 | 7/2015 | Stewart et al. |
| 2016/0046113 A1* | 2/2016 | Witte ................ B32B 37/06 156/211 |

FOREIGN PATENT DOCUMENTS

| | | |
|---|---|---|
| WO | 2007039085 A1 | 4/2007 |
| WO | 2008003721 A1 | 1/2008 |
| WO | 2011032865 A1 | 3/2011 |

OTHER PUBLICATIONS

Patent Office of the Cooperation Council for The Arab States of The Gulf Examination Report with English Translation, dated Nov. 21, 2018, regarding Application No. GC2016-32136, 7 pages.

* cited by examiner

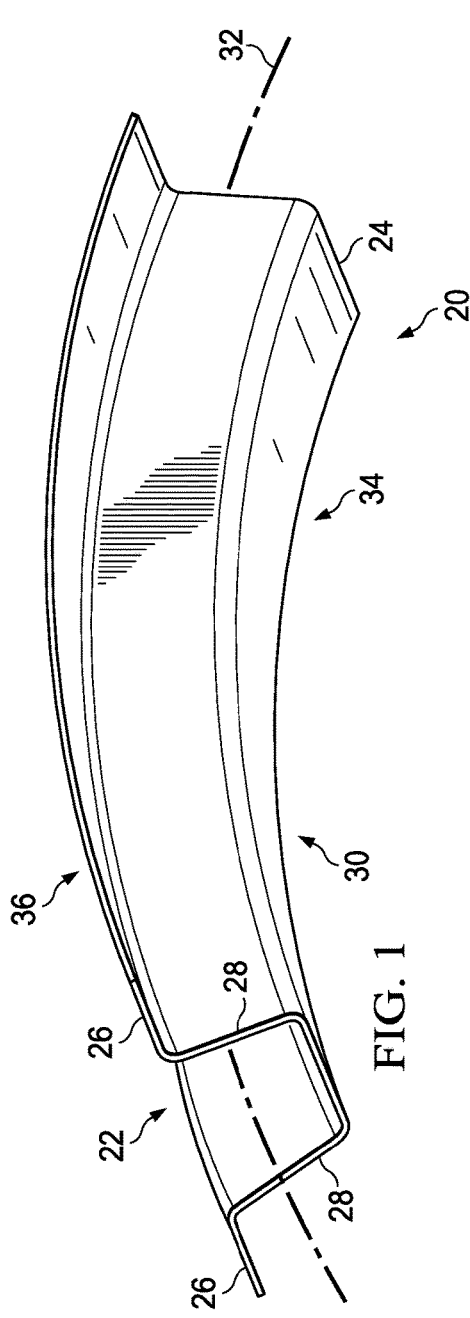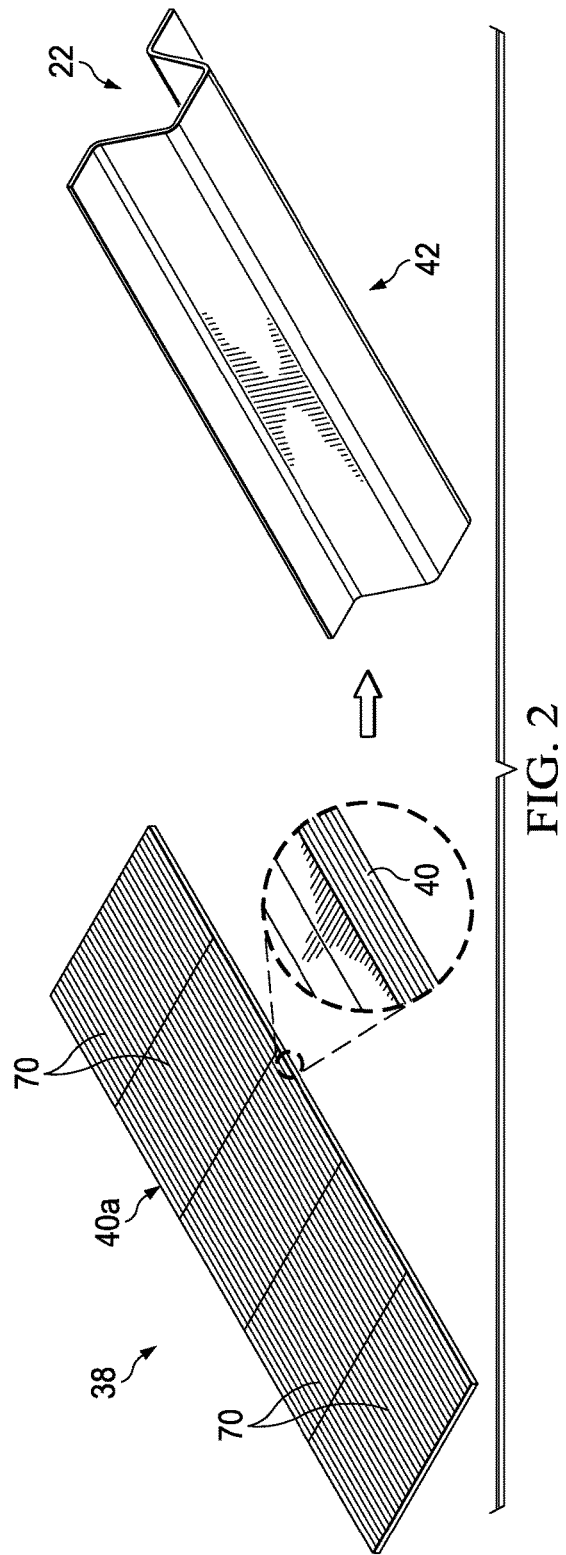

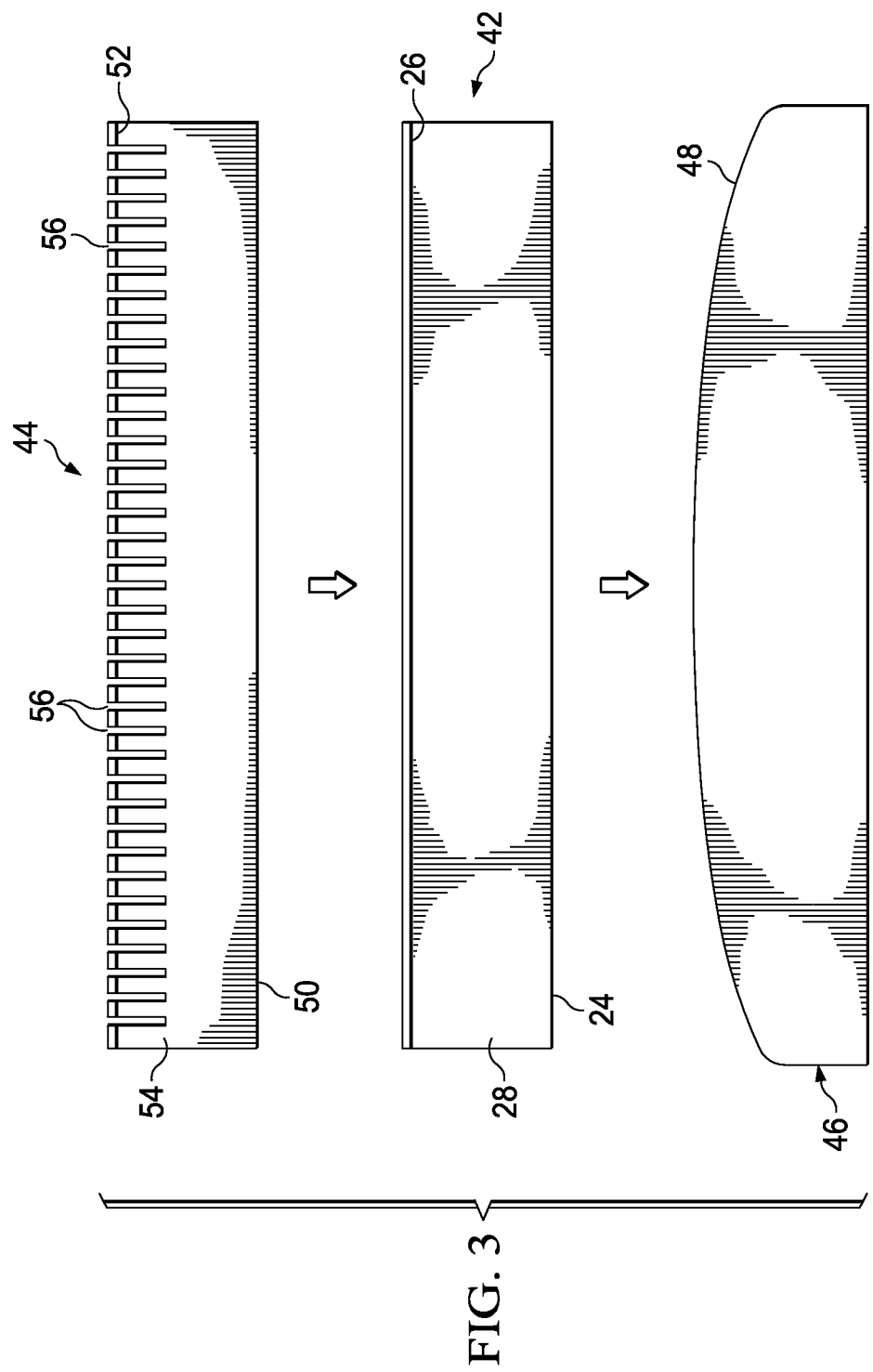

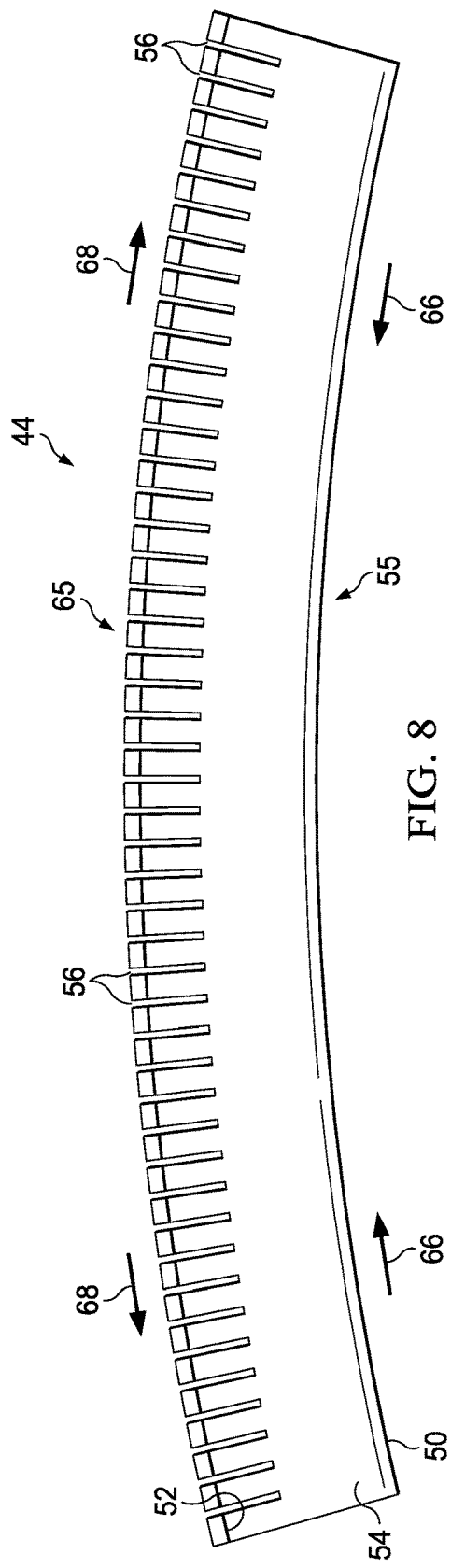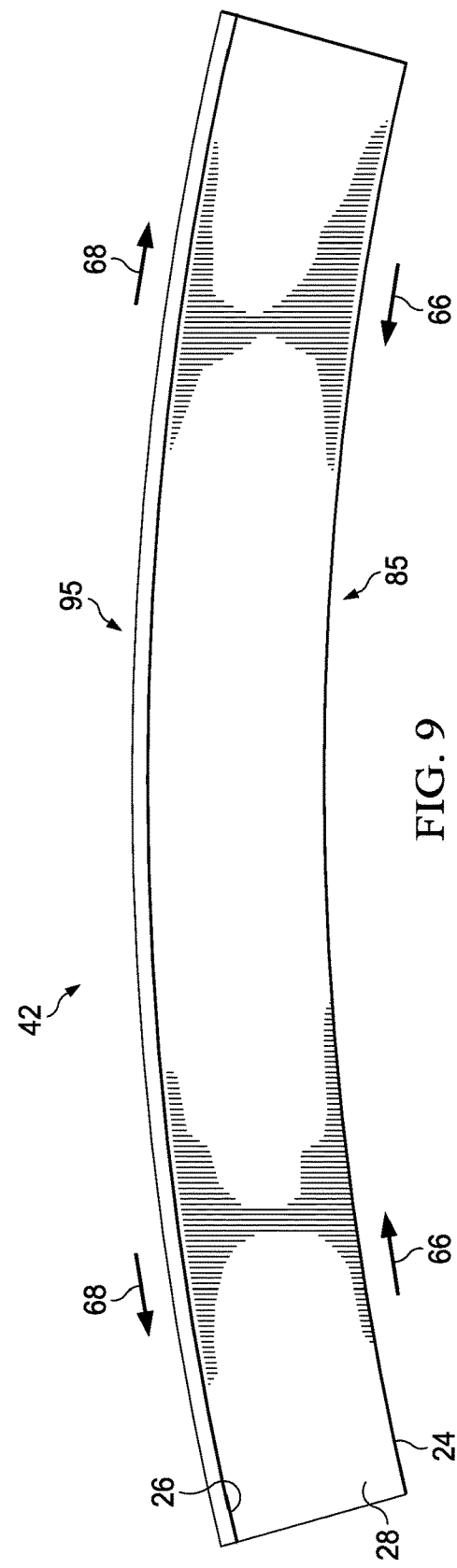

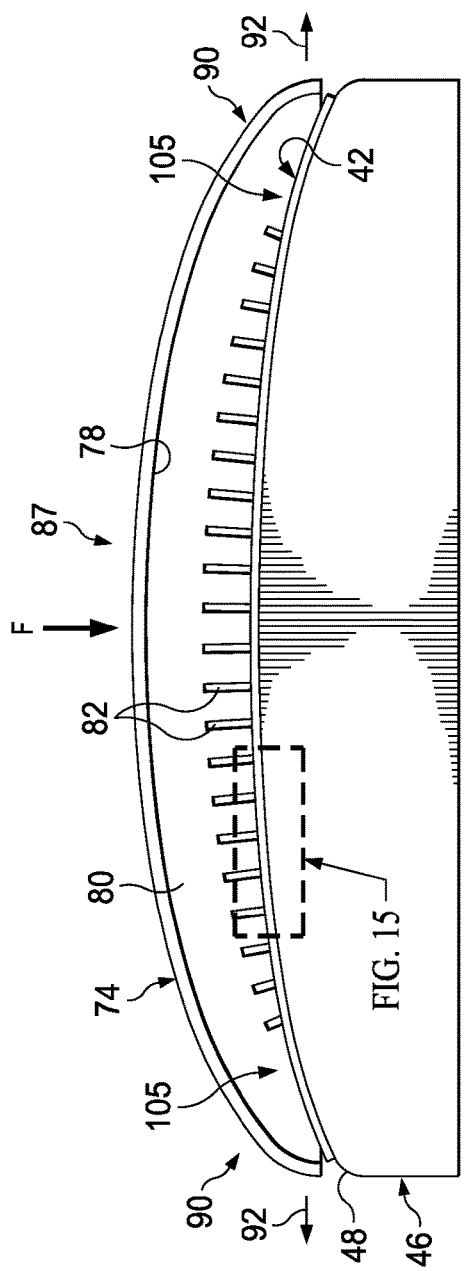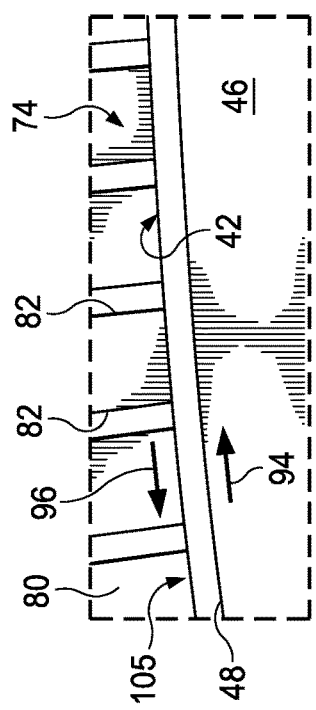
FIG. 14
FIG. 15

METHOD AND DEVICE FOR PRODUCING CONTOURED COMPOSITE LAMINATE STIFFENERS WITH REDUCED WRINKLING

BACKGROUND INFORMATION

1. Field

The present disclosure generally relates to fabrication of composite laminate stiffeners, and deals more particularly with a method and device for producing contoured stiffeners which reduce ply wrinkling.

2. Background

Contoured composite laminate stiffeners such as concave shaped stringers may be fabricated using a combination of primary and secondary forming operations. For example, punch forming may be used to form a flat composite charge into a straight stiffener having a desired cross sectional shape such as, without limitation, a hat-shaped cross section. In a secondary forming operation, the stringer is formed along its length onto a curved forming tool using a substantially straight, semi-flexible compactor having a hat-shaped cross section. Atmospheric pressure applied to the compactor through a vacuum bag, and optionally, autoclave pressure, forms the stiffener onto the curved forming tool, imparting the desired curvature to the stiffener. During the secondary forming operation, bending strain is generated within the stiffener as it conforms to the contour of the forming tool. This bending strain may cause local buckling of the composite fibers in the green laminate, producing undesired wrinkling in the cured part, particularly in areas near the inside radius of the contoured stiffener.

Accordingly, there is a need for a method and device for reducing laminate wrinkling during contouring of composite laminate stiffeners by controlling in-plane strain in those areas of the laminate that may be subject to buckling.

SUMMARY

The disclosed embodiments provide a method and device for producing contoured, composite laminate stiffeners which reduce or eliminate ply wrinkling caused by compressive strain induced in the laminate as it is being contoured. By reducing or substantially eliminating ply wrinkling, the structural performance of the stiffener may be improved, and repair, rework, inspection and certification costs may be reduced.

In one embodiment, the ply wrinkling is reduced or eliminated by increasing tension on the outside radius of a compactor used to form the laminate onto a contoured tool surface. The tension strain on the outside radius of the compactor is increased by cutting slots into the outside radius of the compactor. The slots allow the laminate to be sealed to the compactor and allow out of plane movement of the laminate without introducing compression strain into the inside radius of the stiffener. The suppression of compression strain along the inside radius is achieved by maintaining tension on the outside radius of the laminate as it is being formed onto the contoured cure tool. The slots in the outside radius of the compactor allow the compactor to spread out along the outside radius, thereby applying tension to the outside radius. The resulting tension strain on the outside radius counteracts compression strain on the inside radius produced when the stiffener is formed onto the contoured surface of the cure tool.

In another embodiment, compression strain on the inside radius of the contoured stiffener is reduced or eliminated by employing a contoured compactor that has a curvature greater than the curvature of the contoured tool surface on which the stiffener is formed. The curved compactor increases the tension applied to the inside radius of the compactor. The resulting tensile strain at the inside radius of the stiffener as the stiffener is conformed to the tool surface, counteracts compressive strain on the inside radius of the stiffener generated by the forming process. The tensile strain applied to the stiffener is maintained during the entire contour forming process and is continued throughout curing of the stiffener.

According to one disclosed embodiment, a method is provided of fabricating a contoured composite laminate stiffener. The method comprises assembling a substantially flat, composite laminate charge, forming the composite laminate charge into a substantially straight stiffener having a desired cross sectional shape, and forming a contour in the stiffener having an inside radius and an outside radius. The method also includes reducing compression strain on the inside radius during the forming of the contour. Assembling the composite laminate charge includes laying up prepreg ply segments each having a 0° fiber orientation. Laying up the prepreg ply segments includes overlapping the ply segments. Forming the contour in the stiffener includes placing the straight stiffener on a curved tool surface, placing a compactor on the straight stiffener, and using the compactor to compact the stiffener against the curved tool surface. Reducing compression strain on the inside radius includes increasing tension strain on the outside radius of the compactor. Increasing tension strain on the outside radius of the compactor is performed by forming a series of slits in the outside radius of the compactor. Reducing compression strain on the inside radius of the composite laminate stiffener is performed by using the compactor to apply tension to outer extremities of the composite laminate stiffener.

According to another disclosed embodiment, a method is provided of fabricating a contoured composite laminate hat stiffener. The method comprises forming a substantially flat composite laminate charge into a substantially straight stiffener having a hat-shaped cross section, using the compactor to form a contour in the stiffener, and allowing the compactor to extend as the compactor is forming the contour in the stiffener. The contour has an inside radius and an outside radius, and using the compactor to form the contour includes compacting the stiffener against a tool having a curved tool surface substantially matching the inside radius. The method also includes reducing out-of-plane buckling of the stiffener in an area of the inside radius of the stiffener by producing a tension strain at the outside radius that reduces compression strain in the area of the inside radius of the stiffener. Producing the tension strain includes forming a series of slits in the compactor that allow an inside radius of the compactor to extend as the compactor forms the stiffener against the curved tool surface. In one variation, producing the tension strain includes applying tension to the inside radius of the stiffener. Applying tension to the inside radius of the stiffener includes using the compactor to apply the tension, wherein the compactor is contoured and has a curvature that is greater than the curvature of the curved tool surface. The method further comprises curing the stiffener, wherein producing the tension strain is continued throughout curing of the stiffener.

According to still another disclosed embodiment, a device is provided for forming a contoured composite laminate stiffener. The device comprises adapted to form and compact a composite laminate stiffener against a tool surface, the compactor having a curvature greater than the curvature of the tool surface. The compactor is extensible and is configured to apply tension to the stiffener as the stiffener as being formed against the tool surface. The compactor has a hat-shaped cross section including a cap portion, a pair of flange portions, a pair of web portions connecting the cap with the flange portions. The cap portion includes a series of spaced apart slits therein. The compactor also includes an inside radius section and an outside radius section, and the inside radius section includes a series of slits therein allowing the compactor to flex.

According to a further disclosed embodiment a device is provided for forming a contoured composite laminate stiffener having a hat-shaped cross section. The device comprises a compactor adapted to form the composite laminate stiffener onto a curved tool surface. The compactor includes a cap portion, a pair of flange portions and a pair of web portions connecting the cap portion with the flange portions. The compactor further includes a series of spaced apart slits therein extending through the flange portions and at least partially into the web portions for imparting tension strain to the composite laminate stiffener as the stiffener is being formed onto the curved tool surface. The device may also include a backing plate adapted to overlie and transmit a forming force to the flange portions. The backing plate may be formed of a substantially flexible material. The backing plate may also include a plurality of slits therein allowing the backing plate to flex and conform to the flange portions as the compactor forms the composite laminate stiffener onto the curved tool surface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a perspective view of a contoured hat stringer.

FIG. 2 is an illustration of a perspective view showing conversion of a flat composite laminate charge into a straight stringer having a hat-shaped cross section.

FIG. 3 is an illustration of a longitudinal side view showing a tool assembly employing one embodiment of a compactor.

FIG. 8 is an illustration of a side elevational view of the compactor shown in FIG. 7, useful in explaining reduction of the compressive strain along the inside radius of the compactor.

FIG. 9 is an illustration of the contoured stringer, useful in explaining reduction of wrinkling of the inside radius areas of the stringer.

FIG. 14 is an illustration of the forming tool assembly shown in FIG. 13, wherein the compactor has been partially drawn down onto the forming tool.

FIG. 15 is an illustration of the area designated as "FIG. 15" in FIG. 14, but wherein a portion of the forming tool has been broken away to better illustrate tension strain in the cap of the stringer.

DETAILED DESCRIPTION

Figure 4:
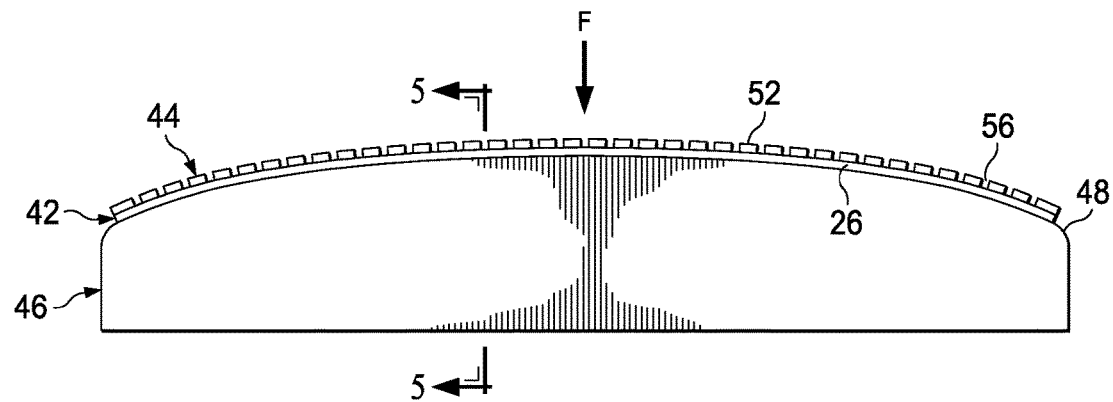
FIG. 4 is an illustration similar to FIG. 3 but showing the compactor and the stringer having been assembled and formed down onto the forming tool, a vacuum bag not shown for clarity.

Referring first to FIG. 1, the disclosed embodiments provide a method and device for producing a contoured composite laminate stiffener 20 having a curvature 30 along its longitudinal axis 32. In the illustrated example, the stiffener 20 is a hat stringer having a hat-shaped cross section 22, however principles of the disclosed embodiments are applicable to a wide range of elongate stiffeners having any of various cross-sectional shapes, including but not limited to C, J, Z and T cross sectional shapes.

The hat shaped cross section 22 comprises a cap 24 connected to a pair of outwardly turned flanges 26 by a pair of webs 28. The illustrated stiffener 20 is concave in shape, with the cap 24 being located along the inside radius 34 of the curvature 30 and the flanges 26 being located along the outside radius 36. As used herein in connection with the contoured stiffener 20, "inside radius" and "outside radius" respectively refer to the inner and outer sections of the stiffener 20, or in other words, those composite plies lying near the inside radius 34 and those plies lying near the outside radius 36 of the stiffener 20. In some embodiments, the cap 24 may be located along the outside radius 36, while the flanges 26 are located along the inside radius 34. In still other embodiments, the stiffener 20 may have more than one curvature 30 as well as straight sections along its length.

In one embodiment, the contoured stiffener 20 shown in FIG. 1 may be produced using a combination of primary and secondary forming operations. FIG. 2 illustrates a primary forming operation in which a flat composite laminate charge 38 is assembled and punch formed into a straight stiffener 42 having a hat-shaped cross section. However, other processes may be employed to form the charge 38 into a straight stiffener 42 having the desired cross sectional shape. The charge 38 comprises a stack of prepreg plies 40 having various fiber orientations, including 0° plies 40a, arranged according to a predetermined ply schedule suitable for the application. As will be discussed below, optionally, some or all of the 0° degree plies 40a may be discontinuous, for example in the form of ply segments 70, to aid in subsequent contouring of the straight stiffener 42.

Attention is now directed to FIGS. 3-6, which illustrate a compactor 44 and a forming tool 46 that may be used in a secondary forming operation to form the straight stiffener 42 (FIG. 2) to a desired contour, such as the concave shape shown in FIG. 1. The forming tool 46, which may comprise a cure tool in which the stiffener 20 is cured, has a curved tool surface 48 shaped to substantially match the desired curvature 30 (FIG. 1) of the stiffener 20. The compactor 44 is used to form the stiffener 42 down onto the tool surface 48 and, as will be discussed later in more detail, is configured to avoid introducing high levels of compression strain along the inside radius 34 (i.e. the cap 24) of the stiffener 20 that may lead to undesired ply wrinkling. The compactor 44 has a cross sectional shape that substantially matches the hat-shaped cross section of the stiffener 20. The compactor includes a cap portion 50 connected with a pair of flange portions 52 by a pair of web portions 54. The compactor 44 may be formed of any suitable materials such as, without limitation, a composite, having sufficient strength and rigidity to apply compaction pressure to the green stiffener 42 in response to an applied forming force F.

The compactor 44 includes a series of longitudinally spaced apart slits 56 therein which extend fully through each of the flange portions 52 and partially into the web portions 54. During a forming operation, the applied forming force F bends the compactor 44 and the stiffener 42 onto the tool 46, causing them to take the shape of the tool surface 48. As the straight compactor 44 bends onto the curved tool surface 48, the outside radius 65 of the compactor 44 is placed in tension, causing it to undergo axial elongation, known as tension strain, while the inside radius 55 is placed in compression and experiences axial compression, known as compression strain. The slits 56 in the flange portions 52 spread when tensioned during the forming process. The spreading of the slits 56 results in an increase in the amount of elongation or tension strain at the outside radius 65. The increased tension strain at the outside radius 65 (the flange portions 52) counteracts and thereby reduces the compression strain in the compactor cap portion 50. The increase in tension strain in the flange portions 52 of the compactor 44 is transferred to the flanges 26 of the green stiffener 42, which in turn reduces compression strain in the stiffener cap 24 and attendant ply wrinkling.

Figure 5:
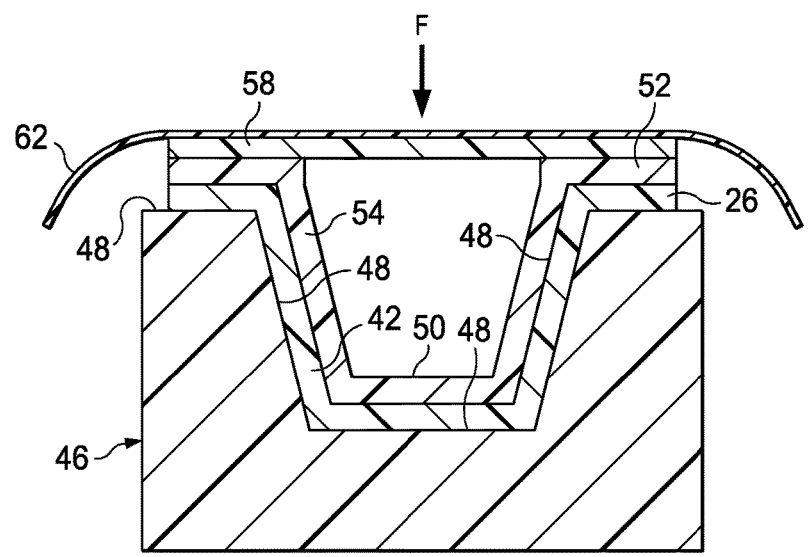
FIG. 5 is an illustration of a sectional view taken along the line 5-5 in FIG. 4, but also showing a backing plate and vacuum bag.
Figure 6:
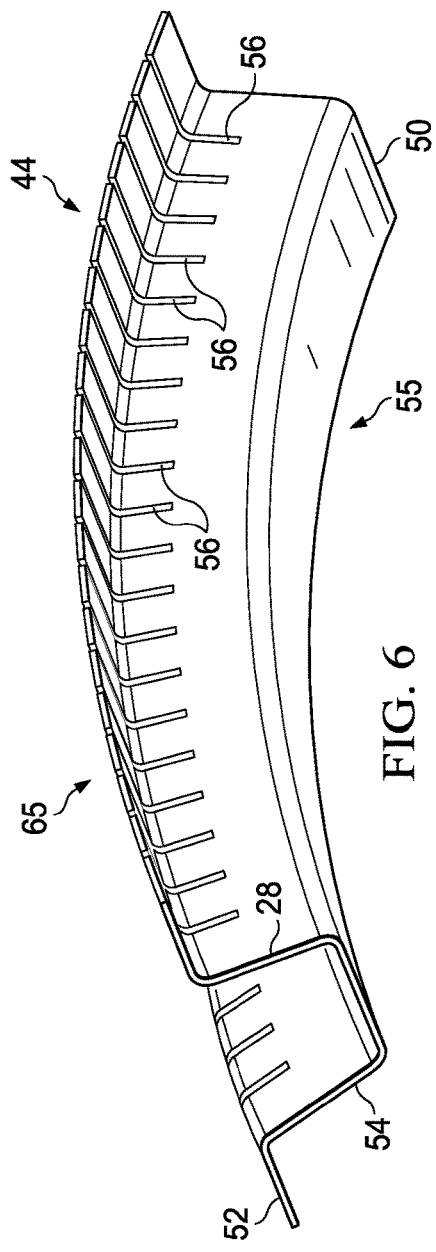
FIG. 6 is an illustration of a perspective view of the compactor shown in FIGS. 3, 4 and 5, after having conformed to the curvature of the forming tool.

Referring particularly to FIGS. 4 and 5, in use, the straight stiffener 42 is placed on the tool surface 48, and the compactor 44, which is substantially straight at this point, is placed inside the straight stiffener 42. Optionally, depending on the application, a backing plate 58 (FIG. 5) is placed on top of the compactor 44, in face-to-face contact with the flange portions 52 of the compactor 44. A vacuum bag 62 (FIG. 5) is then placed over the assembly of the forming tool 46, stiffener 42, compactor 44 and backing plate 58. The vacuum bag 62 is sealed around the forming tool 46, and is then evacuated, causing atmospheric pressure to apply a forming force F to the compactor 44. The applied forming force F is transmitted from the compactor 44 to the stiffener 42, causing the stiffener 42 to be formed down onto the tool surface 48. Although not shown in the Figures, the stiffener forming process may be carried out within an autoclave where internal autoclave pressure may comprise part of the forming force F.

As the forming force F is being applied, the compactor 44 bends to conform to the curved tool surface 48. The slits 56 along the outside radius 65 (see FIG. 6) of the compactor 44 spread during this bending, allowing the compactor 44 to both flex and elongate as it conforms along its length to the curvature of the tool surface 48. As previously noted, the slits 56 function to increase tension strain along the outside radius 65 of the compactor 44 because they allow the outer radius 65 to elongate more than it would otherwise elongate in response the tension stress at the outer radius 65 caused by the applied forming force F. Due to the increased tension strain at the outside radius 65, the tension resulting from the bending stress is shifted or redirected inwardly within the stiffener 42, and is applied at an area within the stiffener 41 that is closer to the inside radius 55. For example, a portion of the applied tension may be shifted from outer radius 65 and applied at an area of the stiffener 42 located somewhere between the inside radius 55 and the outside radius 65. The tension that is applied closer to the inside radius at least partially offsets the compression experienced by the compactor 44 at the inside radius 55, thereby reducing compression strain at the inside radius 55.

During a forming operation, the applied forming force F is transmitted through the compactor 44 to the stiffener 42. The compactor 44 and stiffener 42 are tightly connected together and do not substantially slip relative to each other due to forming force F which presses them together, along with friction and/or adhesive forces between them. Adhesion between the compactor 44 and the stiffener 42 results from the tack of the green stiffener 42, which increases when heated during forming and/or curing. Depending on the application, and the material from which the compactor 44 is formed, it may be necessary or desirable to increase the adhesion and/or friction between the compactor 44 the stiffener 42 so that these two components do not slip relative to each other during the forming process. An increase in the adhesion and/or friction may be achieved by treating the surface of the compactor 44 such that it exhibits greater friction when contacted by the stiffener 42, and/or interposing a layer of adhesive (not shown) between the compactor 44 and the stiffener 42.

Figure 7:
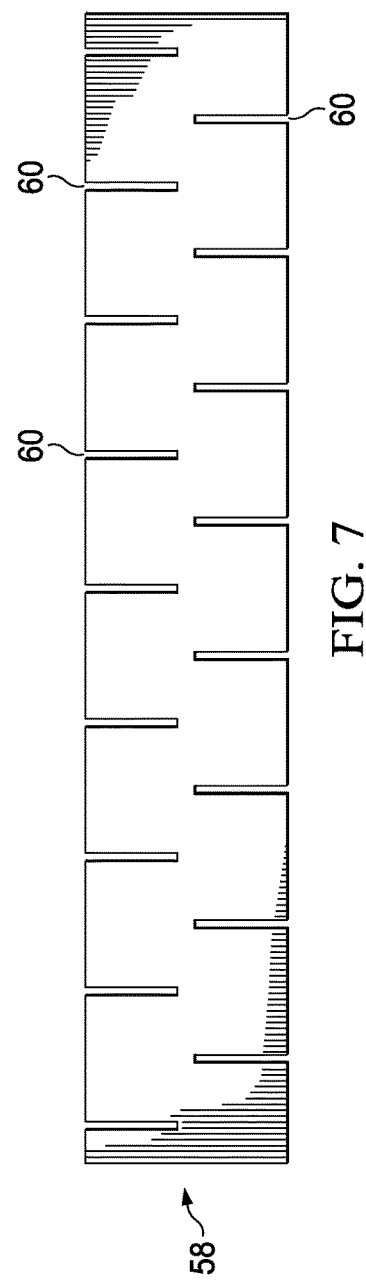
FIG. 7 is an illustration of a plan view of an optional compactor plate forming part of the tool assembly shown in FIG. 5.

The increase in tension strain that allows the compactor 44 to elongate and spread along its length as well as the corresponding reduction in compression strain along the inside radius 55 are transferred from the compactor 44 to the stiffener 42. The slits 56 also aid in achieving a reliable vacuum seal around the green stiffener 42. The backing plate 58 aids in uniformly applying the forming force F to the compactor flange portions 52. In one embodiment, the backing plate 58 may be formed of a flexible material that allows it to bend and conform to the curvature of the tool surface 48. In other embodiments, as shown in FIG. 7, the backing plate 58 may be formed of a more rigid material, such as a composite, that is provided with a series of staggered slots 60 therein to allow the backing plate 58 to flex as necessary in response to the applied forming force F.

FIGS. 8 and 9 respectively illustrate the contours of compactor 44 and the stiffener 42 after being forced down onto the curved tool surface 48, and the straight stiffener 42 has taken the shape of the tool surface 48 which is shaped to complement the shape of the stiffener 42. As the compactor 44 conforms to the curved tool surface 48, areas of the compactor 44 near the inside radius 85, and particularly the cap portion 50 are placed in compression 66. Simultaneously, areas of the compactor 44 near the outside radius 95, namely the flange portions 52 and outer sections of the web portions 54, are placed in tension 68, causing the slits 56 to widen and the compactor 44 to spread. Spreading of the slits 56 in the compactor 44 near the outside radius 65 increase the tension strain in this area, and this increase in tension strain counteracts the compression strain that occurs in the area of the inside radius 55. The increase in tension strain near the outside radius 65 and resulting decrease of compression strain near the inside radius 55 are transferred from the compactor 44 to the stiffener 42, thereby reducing or eliminating ply wrinkling in the cap 24 of the stiffener 42. The increase in tension strain at the outside radius 35 of the stiffener 42 allows the succeeding plies nearer the inside radius 34 to slip relative to each other, thereby reducing the compressive strain near the inside radius 34. The tension 68 and compression 66 experienced by the compactor 44 which are transferred to the inside radius and outside radius 35 of the stiffener 42 are maintained during the entire contouring process and subsequently throughout curing.

Figure 10:
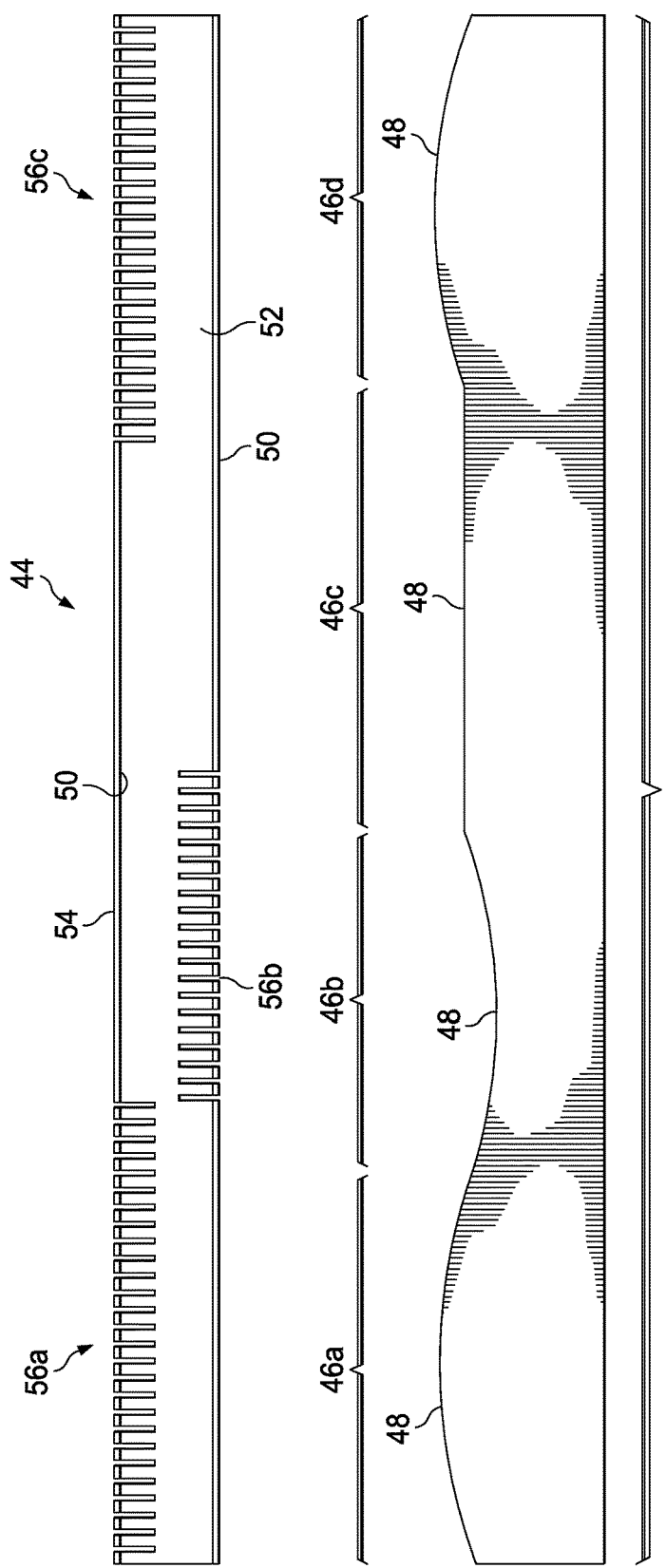
FIG. 10 is an illustration of a longitudinal side view of an alternate embodiment of the compactor and a forming tool having multiple contoured and flat tool surfaces.

As previously mentioned, in some applications, the stiffener 20 may have more than one curvature 30 as well as straight sections along its length. For example, referring to FIG. 10, a forming tool 46 may have multiple sections of 46a-46d with tool surfaces 48 having differing contours that are respectively complementary to corresponding shapes (not shown) of the stiffener 20. In the illustrated example, the tool surfaces 48 in sections 46a and 46d of the tool have curvatures that are opposite of the curved tool surface 48 in section 46b. The oppositely contoured tool surfaces 48 in sections 46b and 46d are connected by a substantially straight or flat tool surface 48 in section 46c. FIG. 10 also illustrates a compactor 44 suitable for compacting a straight stiffener 42 (not shown in FIG. 10) against the forming tool 46. The compactor 44 includes two sets of slits 56a, 56c in the flange portions 52 for reducing compression strain in the cap portion 50 when being formed onto sections 46a and 46d of the tool 46, and a third set of slits 56b in the cap portion 50 for reducing compression strain in the flange portions 54 when being formed onto section 46b of the tool 46. The area of the compactor 44 that forms the stiffener 42 against the flat tool surface 48 in section 46c does not have any slits 56 therein.

Figure 12:
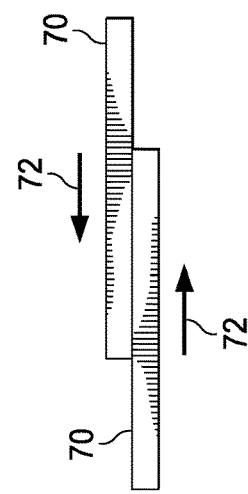
FIGS. 11 and 12 are illustrations of side views of two adjoining segments of discontinuous 0° plies.
Figure 11:
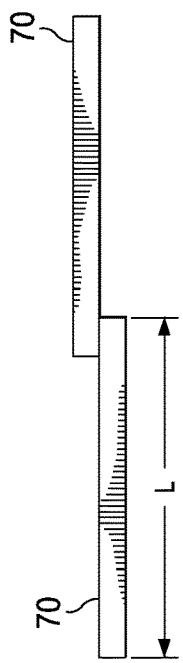

Referring now to FIGS. 11 and 12, in some embodiments, optionally, plies 40a (see FIG. 2) having a 0° orientation with reinforcing fibers generally aligned with the longitudinal axis 32 (FIG. 1) of the stiffener 20 may be discontinuous. For example, the 0° discontinuous plies 40a may comprise 0° prepreg ply segments 70 (FIGS. 2, 11 and 12) that overlap each other along the length of the stiffener 20. The length L of the ply segments 70 will depend on the application and the degree of stiffener contour. During the contour forming process in which the straight stiffener 42 is formed down onto the forming tool surface 48, the ply segments 70 slip 72 in-plane (FIG. 11) relative to each other in order to facilitate forming of the inner radius 85 onto the tool surface 48 and help avoid buckling into an out-of-plane wrinkles.

Figure 13:
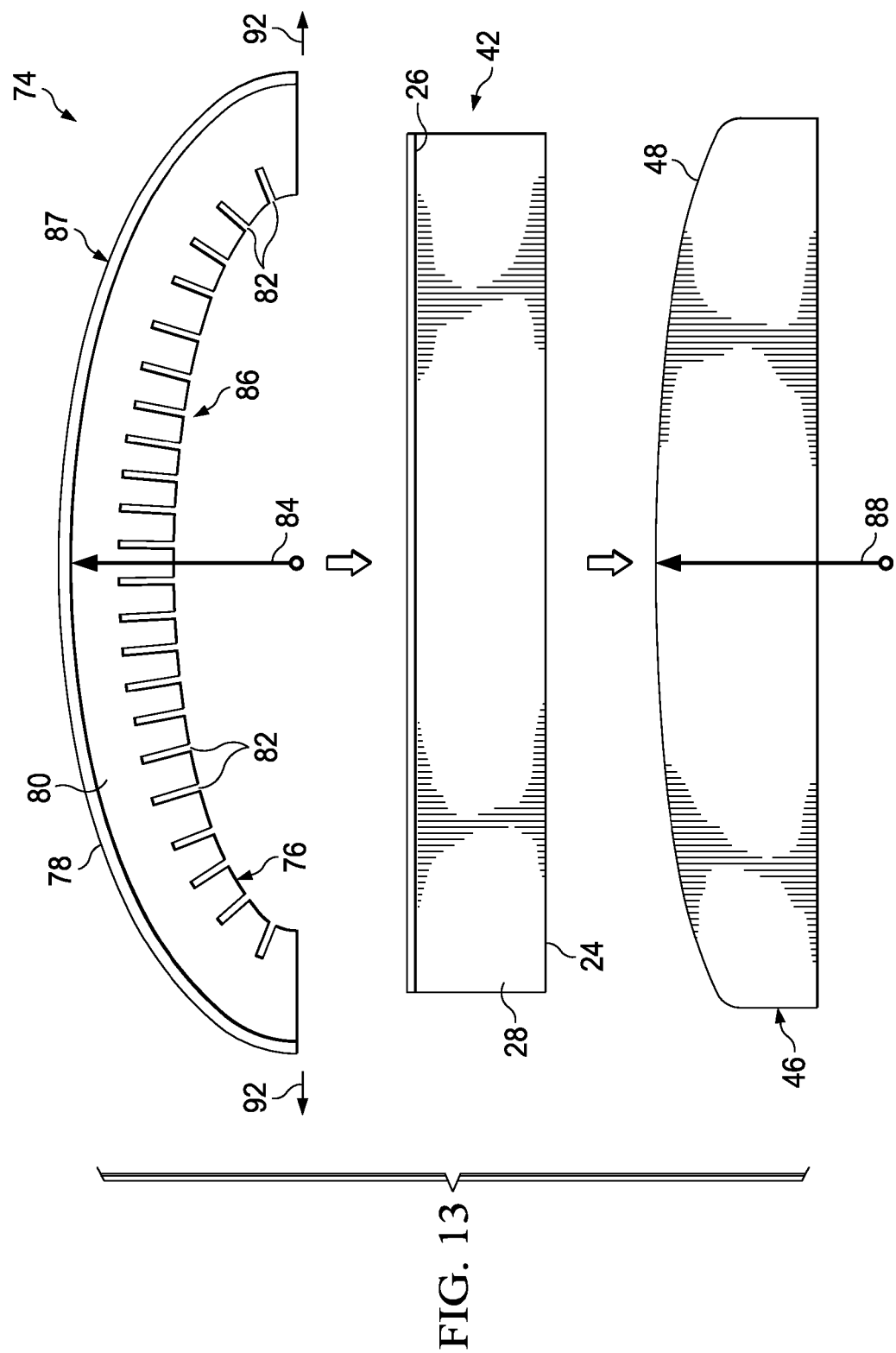
FIG. 13 is an illustration of a forming tool assembly employing an alternate embodiment of the compactor.

Attention is now directed to FIGS. 13, 14 and 15 which illustrate an alternate embodiment that employs a curved compactor 74 having a radius of curvature 84 that is less than the radius of curvature 88 of a tool surface 48 used to contour a straight, green stiffener 42. Thus, the compactor 74 has a curvature that is greater than the curvature of the tool surface 48. The compactor 74 may be formed of any suitable material such as a composite that has sufficient rigidity and stiffness to form the green stiffener 42 down onto the curved tool surface 48, but yet is extensible 92 (FIGS. 13 and 14) along its length. The compactor 74 has an inside radius section 86 and an outside radius section 87. The cross sectional shape of the compactor 74 is substantially identical to that of the straight stiffener 42 and includes a cap portion 76 connected to a pair of flange portions 78 by a pair of web portions 80. In this embodiment, the cap portion 76 is provided with a series of spaced apart slits 82 in the inside radius section 86 thereof which extend partially into the web portions 80 of the compactor 74.

Referring now particularly to FIGS. 14 and 15, in use, the green stiffener 42 is placed on the tool 46, and the compactor 74 is placed on the stiffener 42. Although not shown in the Figures, a vacuum bag is sealed over the compactor 74 and is subsequently evacuated. Evacuation of the bag generates a forming force F that forces the compactor 74 against the stiffener 42. The forming force F causes the stiffener 42 to be formed down onto the curved tool surface 48. Autoclave processing may be used to increase the forming force F. The outer extremities 90 of the compactor 74 initially engage the outer extremities 105 of the stiffener 42. During this engagement, as a result of friction between the compactor 74 and the stiffener 42, the compactor 74 applies tension 96 (FIG. 15) on the outer extremities 105 of the stiffener 42. As the compactor 74 begins flattening as it conforms to the tool surface 48, tension strain is generated in the surface of the compactor 74 that is in contact with the stiffener cap 24. This tension strain in turn induces tension in the stiffener cap 24 which counteracts the effects of the compression load in the stiffener cap 24 as it is conformed to tool surface 48. Optionally, although not shown in the Figures, a layer of high friction material or an adhesive may be placed between the compactor 74 and the stiffener 42 to increase the friction between these two components, and thereby increase the tension 96 applied by the compactor 74 to the stiffener 42.

The presence of the slits 82 in the cap portion 76 and web portions 80 of the compactor 74 allow tension strain and extension 92 of the compactor extremities 90 as the compactor 74 flexes and forced down onto the curved tool surface 48. As previously mentioned, the tension 96 applied by the compactor 74 to inside radius 85 (FIG. 9) of the stiffener 42, counteracts compression strain 94 in the inside radius 85 of the stiffener 42. The reduction or elimination of compression strain 94 the compactor 74, and thus in the inside radius 85 of the stiffener 42, substantially reduces or eliminates ply wrinkling in the cap 24 of the stiffener 42 as it is formed down onto the tool surface 48.

Figure 16:
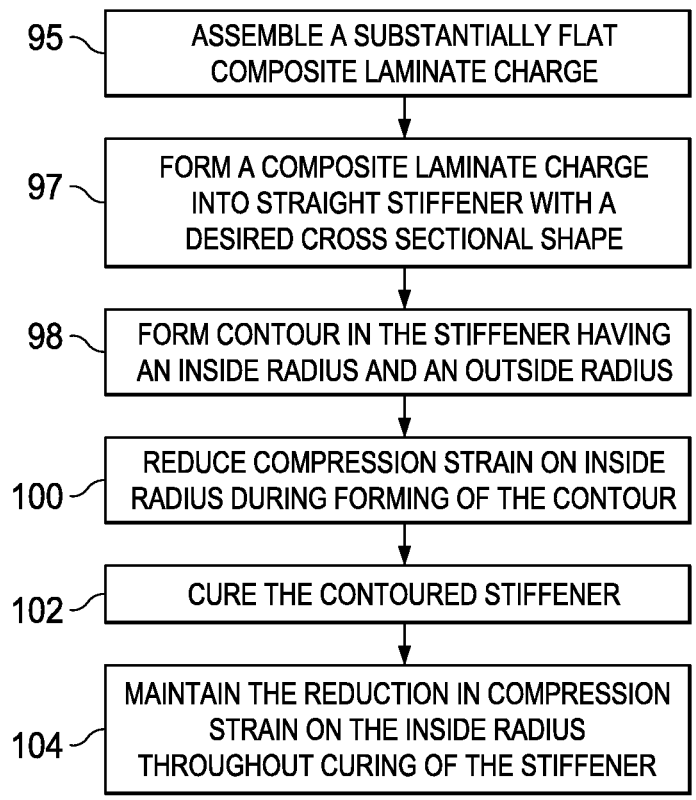
FIG. 16 is an illustration of a flow diagram of a method of fabricating a contoured composite laminate stiffener having reduced wrinkling.

FIG. 16 illustrates the overall steps of a method of forming a contoured, composite laminate stiffener 20. Beginning at 95, a substantially flat composite laminate charge 38 is assembled following which, at step 97, the charge 38 is formed into a straight stiffener 42 having a cross section 22 of a desired shape. At 98, a curvature 30 is formed into the stiffener 42. The contour has an inside radius 34 and an outside radius 36. At 100, compression strain on the inside radius 34 of the stiffener is reduced or eliminated during forming of the curvature 30 in the stiffener 42. At 102, the contoured stiffener 20 is cured, and at 104, the reduction of the compression strain on the inside radius is maintained throughout curing of the stiffener.

Figure 17:
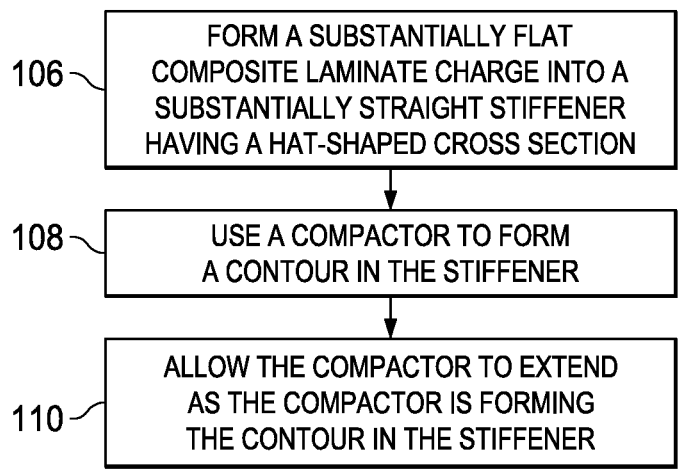
FIG. 17 is an illustration of a flow diagram of a method of fabricating a contoured composite laminate hat stiffener.

FIG. 17 illustrates the overall steps of a method of producing a contoured composite laminate hat stiffener. Beginning at 106, a substantially flat composite laminate charge 38 is formed into a substantially straight stiffener 42 having a hat-shaped cross section 22. At 108, a compactor 44 is used to form a contour in the stiffener 42. At 110, the compactor is allowed to extend as the compactor 44 is forming the contour in the stiffener 42.

Figure 18:
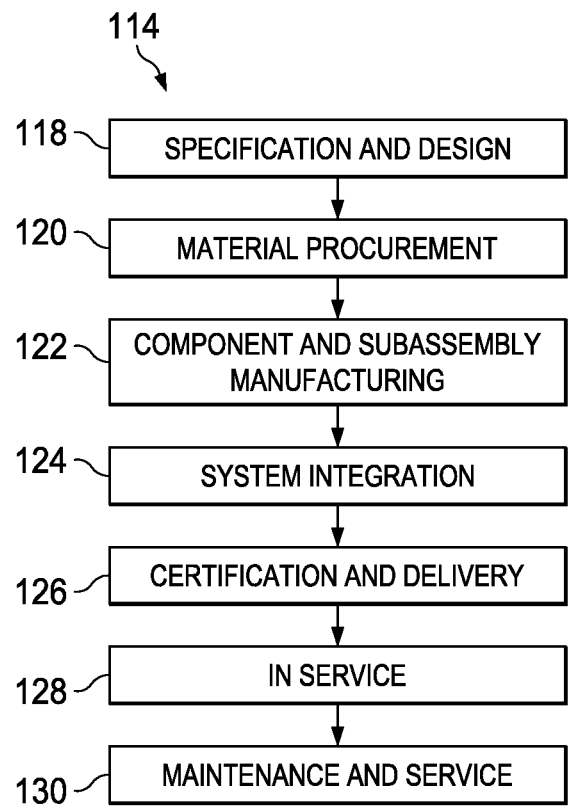
FIG. 18 is an illustration of a flow diagram of aircraft production and service methodology.
Figure 19:
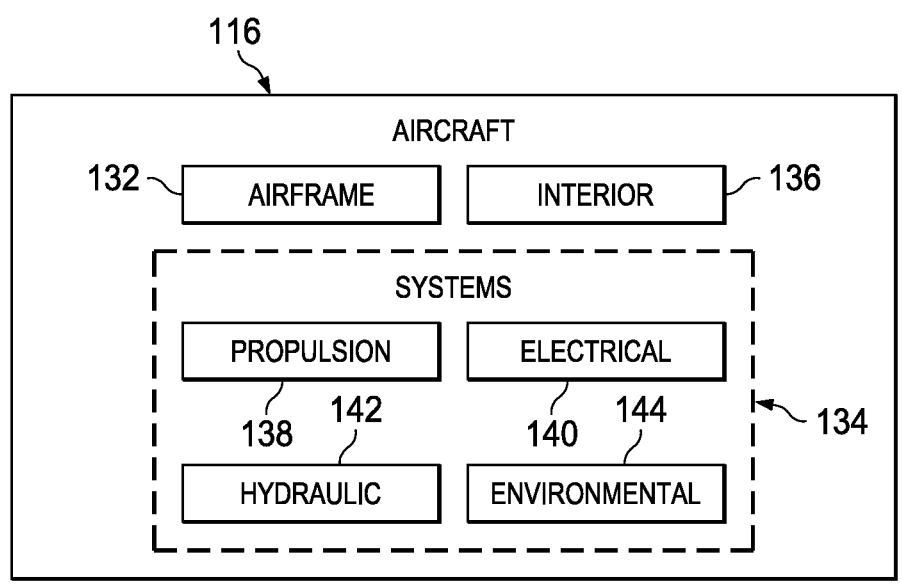
FIG. 19 is an illustration of a block diagram of an aircraft.

Embodiments of the disclosure may find use in a variety of potential applications, particularly in the transportation industry, including for example, aerospace, marine, automotive applications and other application where contoured elongate composite stiffeners, such as contoured stringers, may be used. Thus, referring now to FIGS. 18 and 19, embodiments of the disclosure may be used in the context of an aircraft manufacturing and service method 114 as shown in FIG. 18 and an aircraft 116 as shown in FIG. 19. Aircraft applications of the disclosed embodiments may include, for example, without limitation, stringers, spars and beams, to name only a few. During pre-production, exemplary method 114 may include specification and design 18 of the aircraft 116 and material procurement 120. During production, component and subassembly manufacturing 122 and system integration 124 of the aircraft takes place. Thereafter, the aircraft 116 may go through certification and delivery 126 in order to be placed in service 128. While in service by a customer, the aircraft 116 is scheduled for routine maintenance and service 130, which may also include modification, reconfiguration, refurbishment, and so on.

Each of the processes of the method 114 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 116 produced by exemplary method 114 may include an airframe 132 with a plurality of systems 134 and an interior 136. Examples of high-level systems 134 include one or more of a propulsion system 138, an electrical system 140, a hydraulic system 142 and an environmental system 144. Any number of other systems may be included. Although an aerospace example is shown, the principles of the disclosure may be applied to other industries, such as the marine and automotive industries.

Systems and methods embodied herein may be employed during any one or more of the stages of the production and service method 114. For example, components or subassemblies corresponding to production process 122 and 124 may be fabricated or manufactured in a manner similar to components or subassemblies produced while the aircraft 116 is in service 128. Also, one or more apparatus embodiments, method embodiments, or a combination thereof may be utilized during the production stages 122 and 124, for example, by substantially expediting assembly of or reducing the cost of an aircraft 116. Similarly, one or more of apparatus embodiments, method embodiments, or a combination thereof may be utilized while the aircraft 116 is in service, for example and without limitation, to maintenance and service 130.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a contoured composite laminate stiffener, the method comprising:
   assembling a composite laminate charge comprising a substantially flat shape;
   forming the composite laminate charge into a stiffener comprising a flange connected to a web connected to a cap comprising a substantially straight shape comprising a desired cross sectional shape;
   subsequently using a compactor and forming a contour comprising an inside radius and an outside radius into the stiffener;
   spacing slits along a length of an outside edge of the compactor, each slit in the slits cut, substantially perpendicular to the length, through the flange and into an outside edge of the web of the compactor;
   inhibiting a compression strain, resulting from forming the contour in the stiffener, on the inside radius of the stiffener during the forming of the contour, via spreading apart the slits during the forming the contour; and
   subsequently, curing the stiffener comprising the contour.

2. The method of claim 1, wherein assembling the composite laminate charge includes laying up prepreg ply segments each having a 0° fiber orientation.

3. The method of claim 2, wherein laying up the prepreg ply segments includes overlapping the prepreg ply segments.

4. The method of claim 1, wherein forming the contour in the stiffener includes:
   placing the stiffener comprising the substantially straight shape on a curved tool surface,
   placing the compactor on the stiffener comprising the substantially straight shape, and
   using the compactor to compact the stiffener comprising the substantially straight shape against the curved tool surface.

5. The method of claim 4, wherein inhibiting the compression strain on the inside radius includes increasing tension strain on the outside radius of the compactor.

6. The method of claim 5, wherein spreading of the slits enhances elongation and tension strain on the outside radius of the compactor.

7. The method of claim 4, wherein inhibiting the compression strain on the inside radius of the stiffener is performed by using the compactor to apply tension to outer extremities of the stiffener.

8. A method of fabricating a contoured composite laminate hat stiffener, the method comprising:
   forming a substantially flat composite laminate charge into a stiffener comprising a hat-shaped cross section comprising a flange connected to a web connected to a substantially straight cap portion;
   forming, using a compactor, a contour comprising an outside radius, in the stiffener;
   spacing slits along a length of an outside edge of the compactor, each slit in the slits cut, substantially perpendicular to the length, through the flange and into an outside edge of the web of the compactor;

increasing, as the compactor is forming the contour in the stiffener, a tension strain at the outside radius of the compactor via spreading apart the slits; and subsequently, curing the stiffener comprising the contour.

9. The method of claim 8, further comprising:

the contour comprising an inside radius and the outside radius, and using the compactor to form the contour includes compacting the stiffener against a tool comprising a curved tool surface substantially matching the inside radius.

10. The method of claim 9, further comprising inhibiting, by producing the tension strain at the outside radius reducing compression strain, due to forming the contour, in an area of the inside radius of the stiffener, out-of-plane buckling of the stiffener in the area of the inside radius of the stiffener.

11. The method of claim 10, further comprising producing the tension strain comprising the slits in the compactor allowing the outside radius of the compactor to extend as the compactor forms the stiffener against the curved tool surface.

12. The method of claim 10, further comprising:

curing the stiffener, and wherein producing the tension strain is continued throughout curing of the stiffener.

13. The method of claim 10, wherein producing the tension strain comprises elongating the outside radius of the stiffener.

14. A method of fabricating a contoured composite laminate hat stiffener, the method comprising:

forming a substantially flat composite laminate charge into a stiffener comprising a cross section comprising a flange connected to a web connected to a substantially straight cap portion;

forming, using a compactor, a contour, comprising an outside radius, in the stiffener, such that the compactor comprises a contour comprising a curvature greater than a curvature of a tool surface receiving the compactor;

spacing slits along a length of an inner radius of the compactor, each slit in the slits cut substantially perpendicular into an edge of the inner radius of the compactor;

applying a tension strain to the outside radius of the stiffener via increasing a tension strain in an inner radius of the compactor, as the compactor forms the contour in the stiffener, via spreading apart the slits spaced along edge of the inner radius of the compactor; and subsequently, curing the stiffener comprising the contour.

* * * * *